Feb. 11, 1958     L. H. METZGER ET AL     2,822,648

ROTARY TOOL MOUNTING AND METHOD OF ASSEMBLING THE SAME

Filed Oct. 15, 1956     2 Sheets-Sheet 1

INVENTORS:
LEOPOLD H. METZGER
JOHN V. FANTOZZI
BY *Fred Gerlach*
ATT'Y

Feb. 11, 1958 L. H. METZGER ET AL 2,822,648
ROTARY TOOL MOUNTING AND METHOD OF ASSEMBLING THE SAME
Filed Oct. 15, 1956 2 Sheets-Sheet 2
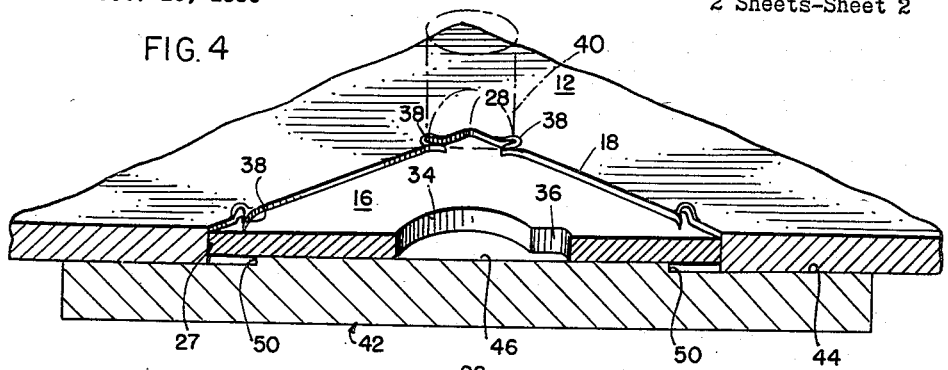
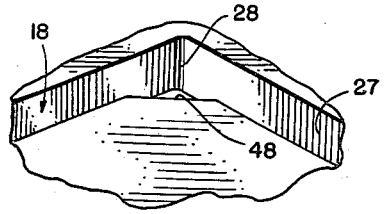
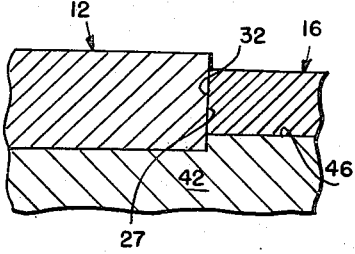
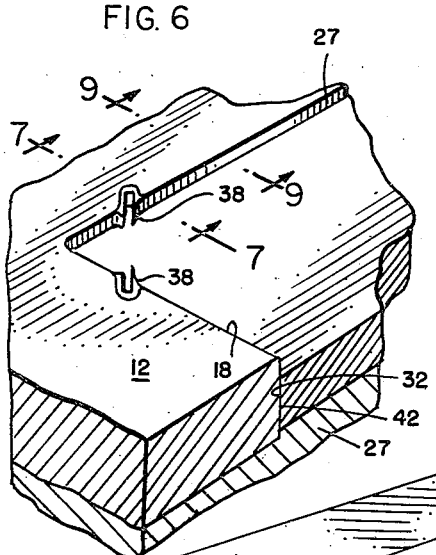
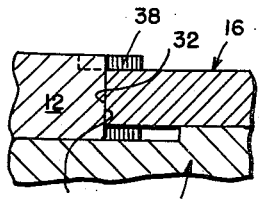
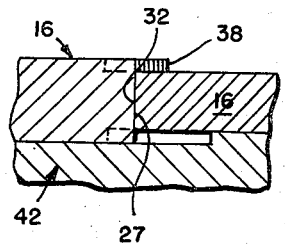
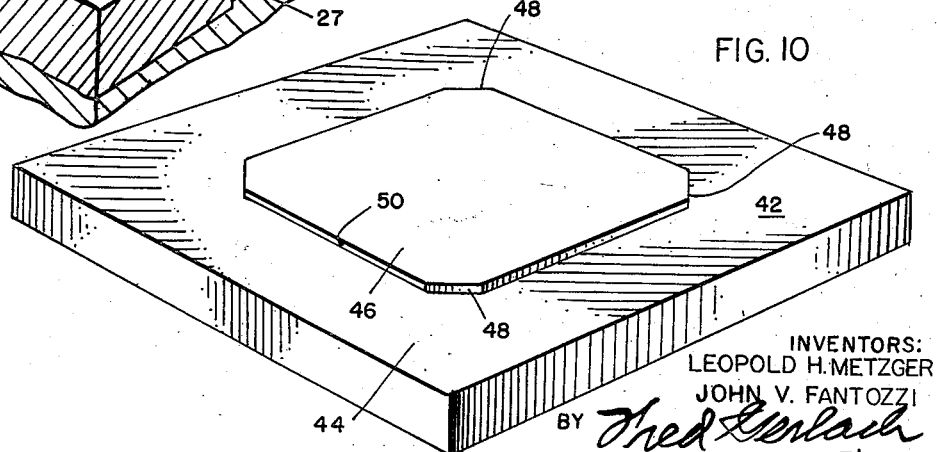
INVENTORS:
LEOPOLD H. METZGER
JOHN V. FANTOZZI
BY Fred Gerlach
ATT'Y United States Patent Office 2,822,648
Patented Feb. 11, 1958

2,822,648

ROTARY TOOL MOUNTING AND METHOD OF ASSEMBLING THE SAME

Leopold H. Metzger, Glencoe, and Vincent J. Fantozzi, Chicago, Ill., assignors to Super-Cut, Inc., Chicago, Ill., a corporation of Illinois Application October 15, 1956, Serial No. 615,782

10 Claims. (Cl. 51—168)

The improved rotary tool mounting comprising the present invention, as well as the method of assembling the same, has been designed primarily for use in connection with circular diamond faced saw blades such as are employed in the cutting of relatively hard material such as stone, marble, concrete and the like, such blades usually consisting of a centrally apertured thin flat circular metallic blade body or disc, and a peripheral cutting rim including a single annular matrix, or a series of circumferentially spaced matrices containing diamond fragments. The invention however is not limited to such use and the present rotary tool mounting may, if desired, with or without modification, be employed in connection with the operative positioning of a thin disc-like member on a central driving shaft regardless of the specific nature of the member or of the use to which it may be put. Irrespective however of the particular use for which the invention may find application, the essential features thereof are at all times preserved.

Rotary cutting tools of the character briefly outlined above are invariably mounted on and rotated by a power driven shaft of such diameter that it may snugly receive the central aperture of the cutting disc thereover and, when so received, the disc is adapted to be clamped in operative position between a pair of clamping collars, one of which may be fixed and the other of which may be threaded, and sometimes, particularly in connection with discs of large diameter, torque-receiving means in the form of a driving pin hole, a keyway, or a combination of one or more of these expedients, is employed for receiving driving torque from the driving shaft and imparting the same to the disc for driving purposes.

In view of the large number of machines currently manufactured for use with rotary saw blades of the character set forth above having driving shafts which vary in size, it has been necessary for the manufacturer to produce a wide variety of such saw blades with different diameter center holes and for the jobber to keep a large inventory of the saw blades, many of the saw blades having the same diameter. This practice of maintaining a large stock of saw blades, many of which do not vary in operating size, is, of course, uneconomical and efforts to adapt saw blades having a central aperture of large diameter of driving shafts of smaller diameter by the use of bushing-type inserts or adaptors have not proven altogether satisfactory due to the small thickness of the blade body and the difficulty of properly centering an adaptor device within the opening. Additionally, the application of bushing-type adaptors to the saw disc body at the time the saw blade assemblies are mounted on the driving shaft, and the removal of the adaptor from the saw disc body when cutting operations are complete, or when changing blades, involves considerable manipulation and is thus time-consuming.

The present invention is designed to overcome the above-noted limitations that are attendant upon the construction and use of diamond faced saw blades and toward this end it contemplates the provision of a novel combination of saw blade body and adaptor or insert therefor which cooperate in a novel manner to retain the insert permanently associated with the blade body against dislodgment, either during use of the saw blade or during assembly and disassembly of the composite saw blade on the driving shaft. By such an arrangement, a manufacturer or jobber by keeping on hand the requisite number of saw blade bodies of each standard overall diameter, together with a variety of the inserts or adaptors by means of which these standard diameter blades may be adapted to driving shafts of varying diameters, may meet all requirements with a materially reduced inventory, the economy of the situation arising, of course, from the fact that the inserts are far less costly than are the saw blade bodies or the saw blade assemblies.

The invention further contemplates the provision of a novel method by means of which the present saw blade inserts may be permanently and fixedly mounted within the saw blade body with a minimum amount of labor and with no special machining and whereby when an initial installation is made involving a particular saw blade of the requisite diameter and a particular insert having facilities for mounting the same on a given driving shaft, the union is complete and permanent. Thereafter the composite blade assembly including the blade body, the insert and the diamond filled matrix or matrices may be regarded as a unit and put to the same use as a standard one-piece saw blade body and its replaceable matrix assembly, including the installation of the same on the driving shaft and its removal therefrom for replacement or repair.

Still further, the invention contemplates, in carrying out the method thereof, the use of a novel form of anvil device which greatly facilities assembly of the saw blade body and its insert, the device being of simple construction with no moving parts and being designed for repeated use in cooperation with a simple metal swaging or forming tool for effecting the permanent union between the saw blade body and its respective insert.

The provision of a combination saw blade body and adaptor insert therefor, of a method of assembling such body and adaptor, and of an anvil for facilitating such assembly, all of the character briefly outlined above, being among the principal objects of the invention, it is a further and important object to provide a saw blade body and adaptor capable of ease of assembly and which, when assembled, is characterized by an absence of rivets, locking screws or pins, or other extraneous fastening devices.

Other objects and advantages of the invention, not at this time enumerated, will become more readily apparent as the nature of the invention is better understood.

In the accompanying two sheets of drawings forming a part of this specification a preferred embodiment of the invention and of the method by means of which it is carried out have been illustrated.

In these drawings:

Figure 4 is a fragmentary perspective view, partly in section, taken on a radial plane through a saw blade and adaptor plate showing the same in a partially assembled relationship operatively positioned on an anvil device and illustrating the manner in which the assembly of parts is made;

Figure 5 is a fragmentary perspective view of a medial fragment of a saw blade body in the vicinity of the central opening thereof and showing the same operatively positioned on the anvil device preparatory to receiving therein the adaptor plate;

Figure 6 is a fragmentary perspective view, partly in section, of a medial fragment of the completely assembled saw blade body and adaptor plate and showing the same operatively positioned on the anvil device prior to removal of the same from the latter;

Figure 7 is a sectional view taken substantially along the vertical plane indicated by the line 7—7 of Figure 6 and illustrating a final assembly operation;

Figure 8 is a sectional view similar to Figure 7 and illustrating an earlier assembly operation;

Figure 9 is a sectional view taken substantially along the vertical plane indicated by the line 9—9 of Figure 6; and Figure 10 is a perspective view of the anvil device utilized in connection with the assembly of the saw blade body and adaptor plate in the manner illustrated in Figures 4 to 10 inclusive.

Figure 1:
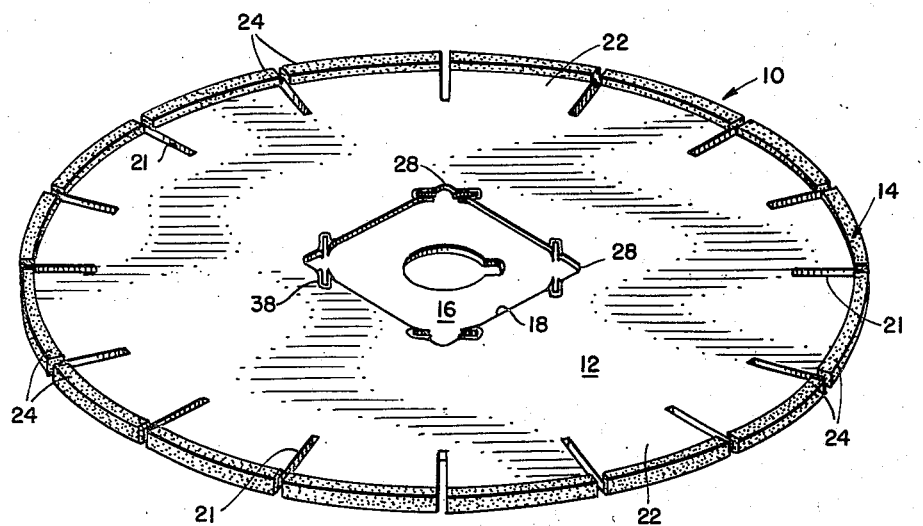
Figure 1 is a perspective view of an assembled circular saw blade and adaptor plate therefor constructed and assembled in accordance with the principles of the present invention.

Referring now to the drawings in detail, the saw blade assembly shown in Figure 1 constitutes a preferred embodiment of the invention and is designated in its entirety at 10. It is illustrated independently of the conventional drive shaft and clamping collar arrangement on which it may be operatively mounted and it is comprised of three principal parts or assemblies including a saw blade body 12, an annular matrix assembly 14 and a central adaptor plate 16.

The saw blade body 12 is generally of circular design and is in the form of a relatively thin flat sheet or plate, preferably of hardened steel, having a central aperture or opening 18 for receiving the adaptor plate 16 and a circular periphery 20 which may be slotted inwardly at equally spaced regions therearound to divide the peripheral region of the blade body 12 into a series of circumferentially spaced sectors 22, each of which is adapted to receive thereon one unit 24 of the matrix assembly 14, the latter providing an interrupted cutting rim proper 26 comprised of crushed or fragmented diamonds. The matrix segments or units 24 may be of a metallic nature and are suitably secured, as by soldering, to the respective sectors 22 and serve to present their heterogeneous mass of fragmented diamonds radially outwardly for cutting purposes in the usual manner of construction and assembly of these units. The construction and arrangement of the matrix units 24 as disclosed herein are purely conventional and other forms of matrices may be employed if desired. No claim is made herein to any novelty associated with the matrix assembly 14, the invention residing rather in the novel construction, combination and arrangement of parts, as well as in the method of assembling the same and in the apparatus employed for such assembly, which will now be more fully described and subsequently claimed.

Figure 2:
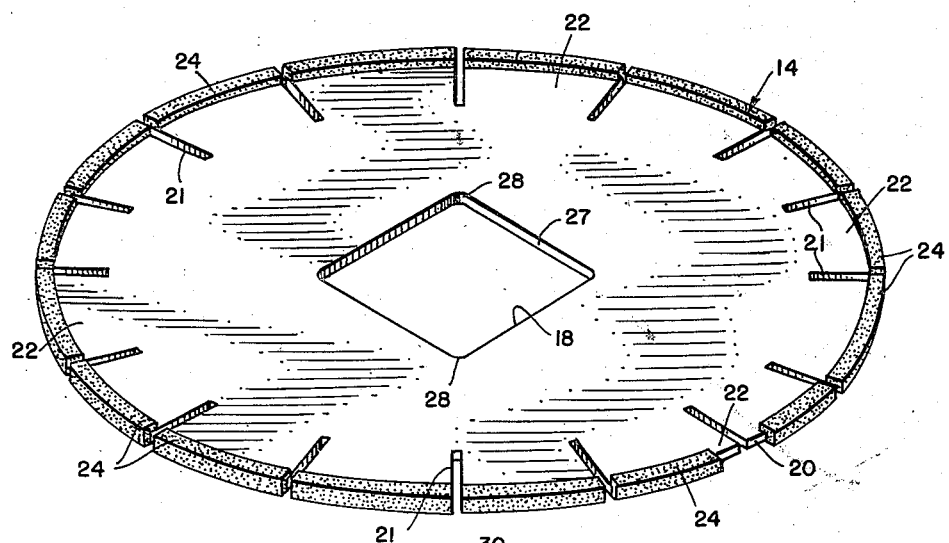
Figure 2 is a perspective view similar to Figure 1 showing the saw blade body prior to assembly of the adaptor plate thereon.
Figure 3:
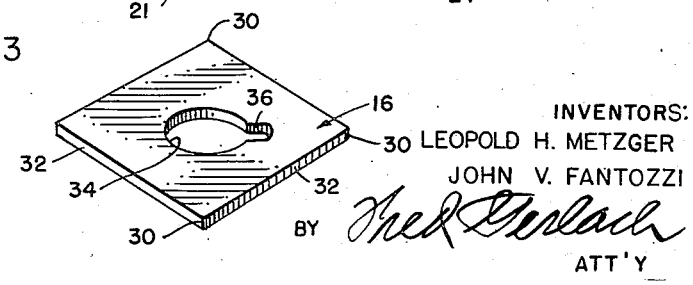
Figure 3 is a perspective view of the adaptor plate of Figure 1.

Still referring to Figures 1 and 2, the central opening 18 in the blade body 12 is of rectangular design, it being shown as square, and it is adapted to receive therein the adaptor plate 16 in snugly fitting relationship with the plate substantially filling the void created by the opening. The four sides of the opening 18 form true flat surfaces 27 which are normal to the plane of the body 12 and the corners 28 of the opening may be rounded as shown. The adaptor plate 16 is in the form of a flat sheet or plate of hardened steel of the same size and having the same square boundary outline as the opening 18 but of somewhat thinner metal gauge as best seen in Figure 4. It likewise is provided with rounded corners 30 and true flat side surfaces 32. The adaptor plate 16 is formed with a central shaft-receiving opening or hole 34 therein of circular design, the opening being notched as at 36 to provide a driving keyway designed for cooperation with a driving key or the like associated with the drive shaft upon which the composite saw blade 10 may be operatively mounted. The use of a driving keyway such as the keyway 36 herein is merely exemplary of one of a number of suitable driving means which may be employed in connection with the adaptor plate 16 and it will be understood of course that, if desired, one or more driving holes, notches, recesses, sockets or the like may be substituted for the keyway shown herein. Furthermore, if desired, the driving notch may be omitted altogether and the use of conventional friction clamping collars or the like relied upon to establish a driving connection between the driving shaft and adaptor plate. Irrespective however of the particular driving means employed for applying torque to the adaptor plate 16 from the driving shaft, the essential features of the invention are not altered.

It will be understood, of course, that the size of the central opening 18 formed in the saw body 12 is considerably larger than the cross sectional area of the shaft which is contemplated for mounting purposes. Stated otherwise, the minimum dimension of the opening 18 is considerably larger than the maximum or overall diameter of the shaft so that a comparatively large amount of driving force will be applied to the saw body 12 from the shaft through the adaptor plate 16. This large moment of driving force is enhanced by the non-circular shape of the opening 18 and the corresponding square shape of the plate 16 inasmuch as the driving moment applied to the saw body 12 will be a function of the diagonal dimension of the plate rather than of the lateral or transverse dimensions thereof.

The adaptor plate 16 is capable of being received within the opening 18 and of being securely and permanently fastened therein in such a manner that the relatively thin plate 16 is centered axially within the opening. Toward this end, as best seen in Figures 4 and 6 to 8 inclusive, portions of the metal of the saw body 12 on each side of the same and in the vicinity of the corner regions of the opening 18 are displaced inwardly of the opening as at 38 so that the displaced metal both overlies and underlies as the case may be, the peripheral edges of the adaptor plate 16 and firmly grips the same therebetween to thus anchor the plate in position within the opening. According to the present invention, there are sixteen such regions of metal displacement, eight on each side of the saw blade body 12 with such regions being directly opposed to each other in pairs on opposite sides of the opening 18. At each corner region of the opening 18, four such metal displacements 38 are made, two on each side of the opening with the displacements being equally spaced from the corner proper 28 and lying wholly within the planar confines of the body 12.

The metal displacements are made by forcing the metal of the saw body 12 at and near the surfaces of the body in the designated regions inwardly of the rectangular opening and over the adjacent edge of the centered adaptor plate 16, and, to a certain extent, into the metal of the adaptor plate whereby particles of the metal in the two adjacent bodies comingle with each other utilizing a suitable tool such as a punch or a chisel, and preferably the latter, such a tool being shown in dotted lines in Figure 4 and designated at 40. To facilitate proper metal displacement a specially designed and novel form of anvil device or member 42 is preferably employed, such an anvil member being shown in detail in Figure 10. The anvil member 42 is in the form of a generally square block of hardened steel of a size somewhat larger than the size of the square opening 18 formed in the saw blade body 12 and having an upper, relatively wide, rectangular operating or anvil surface proper 44 surrounding a central raised flat table portion 46 of square configuration with truncated corners 48. The narrow sides 50 of the raised table portion 46 are of a height equal to the equally proportioned distance between the rim of the opening 18 on either side thereof and the plane of the upper or lower face, as the case may be, of the centered adaptor plate 16 and thus, when the saw blade body 12 is positioned on the anvil member 42 with the raised table portion 46 projecting into the opening 18 (this being the operating position of the anvil and blade body), the shallow rectangular recess or well which is created by thus mounting the anvil and saw blade body will be of a depth capable of totally receiving the adaptor plate 16 therein with the latter being positioned entirely within the confines of the recess and properly centered within the opening 18 for subsequent fastening operations therein by the metal displacing procedure outlined above and which constitutes the novel method of the present invention.

The lateral dimensions of the raised table portion 46 are slightly less than the lateral dimensions of the opening 18 so that the former may fit snugly within the latter except at the four corners of the table portion where the metal thereof is relieved to provide the previously mentioned truncated corners 38, these corners serving a purpose that will become clear presently.

In order to assemble the adaptor plate 16 within the opening 18 of the blade body 12, the blade body is centered upon the anvil member 42 so that one side thereof rests squarely upon the operating surface 44 in face-to-face contact therewith and with the table portion 46 extending into the opening 18 as previously described. With the parts in this relationship, the edge of the tool 40 may be applied to the upper surface of the saw blade body 12 with the linear edge of the tool extending over and across one corner of the adaptor plate 16 as shown in Figure 4 so that the extreme end regions thereof engage the metal of the saw blade disc 12 at spaced regions across the corner of the opening. Thereafter, a sharp blow on the free end of the tool, utilizing a hammer or mall for this purpose, will serve to displace some of the adjacent metal inwardly of the opening 18 and over the edge of the adaptor plate at the two regions 38, the displacements being made simultaneously by a single blow of the hammer. It will be understood, of course, that the displacements 38 at each side of the corner 28 may be individually made if desired, utilizing a punch, chisel or other suitable metal-displacing tool. However, for economy of operation, the use of a single tool having a linear edge of sufficient length to straddle the corner region of the opening 18 as previously described is the preferred mode of operation.

The remaining three corner regions of the opening 18 are similarly treated to produce the two displacements 38 of the metal of the saw blade body or disc 12 at each corner region without altering the relative positions of the saw blade body and anvil member 42. Thereafter the saw blade assembly may be removed from the anvil member 42 and replaced thereon in an inverted position with the raised table portion 46 of the anvil member 42 extending into the opening 18 as heretofore. Ordinarily, the blade body 12 in its inverted position will rest squarely upon the working surface 44 but, in the event that any high spots occasioned by the presence of the displacements 38 are present, such high spots may prevent complete seating of the body 12 on the working surface. However, adequate reaction force will be supplied by the anvil at the regions where the tool, in making subsequent displacements of metal, engages the body 12 inasmuch as the displacements are made at regions directly overlying the previously displaced metal. The various metal displacements on the inverted saw blade body 12 may thus be progressively made in opposition to the previous metal displacements so that at each corner region of the opening 18 the edge of the adaptor plate 16 is caused to be straddled by two pairs of opposed displacements 38 and firmly clamped therebetween. It is to be noted that the truncated corners 48 of the raised table portion 46 of the anvil member 42 afford adequate clearance for the displaced metal at the time the saw blade body 12 is reversed upon the anvil so that the raised table portion 46 may extend into the square opening 18 in the blade body 12 without obstruction.

In compliance with Title 35, U. S. Code, Section 22, a preferred form of the invention has been shown in the drawings and described herein, but it should be understood that the invention is not to be limited to the specific disclosure made inasmuch as various changes in the details of construction, as well as in the method involved, may be resorted to without departing from the spirit of the invention. For example, although the central aperture 18 has been shown and described herein as being of square configuration, other polygonal contours may be resorted to. Furthermore, the sides of the opening need not be rectilinear as shown since both rectilinear and curvalinear polygonal contours having either inside or outside corners, or both, are contemplated. The ensuing claims therefore should be construed as broadly as the prior art will permit.

Having thus described the invention what we claim as new and desire to secure by Letters Patent is:

1. The combination with a rotary tool blade in the form of a flat circular metal disc having a central aperture formed therein of polygonal linear configuration and having an outer peripheral cutting edge, of an adapter member by means of which the disc may be operatively mounted on a central driving shaft, said adaptor member comprising a flat metallic plate conforming in configuration to the polygonal configuration of said opening, said plate being disposed and fitting within said opening with a close coextensive edge-to-edge fit completely therearound, said plate being formed with a central shaft-receiving opening therethrough and with torque-receiving means outwardly offset from said opening by means of which the plate may be driven from said shaft, and means frictionally maintaining said plate within said opening against dislodgment.

2. The combination with a rotary tool blade in the form of a flat circular hardened steel disc having a central aperture formed therein of square configuration and having peripheral cutting means at its outer edge, of an adaptor members by means of which the disc may be operatively mounted on a central driving shaft, said adaptor member comprising a flat metal plate of slightly lesser thickness than the thickness of the disc and of substantially the same size and configuration as the configuration of said opening, said plate being disposed entirely within the confines of said opening and lying substantially in the plane of the disc and having its opposite faces spaced inwardly a slight distance from the plane of the opposite faces of the disc, respectively, said plate fitting within said opening with a close coextensive edge-to-edge fit and completely closing the opening, there being a central shaft-receiving hole formed in said plate by means of which the latter may be mounted on a central driving shaft in driving relationship, and means on said disc embracing said plate and frictionally maintaining the latter within said opening against dislodgment.

3. In a composite rotary tool blade, in combination, a flat circular hardened steel disc having a central opening formed therein of square configuration and having peripheral cutting means at its outer edge, an adaptor member by means of which the disc may be operatively mounted on a central driving shaft, said adaptor member comprising a hardened steel plate of slightly less thickness than the thickness of the disc and of substantially the same size and configuration as the size and configuration of said opening, said plate being disposed entirely within the confines of said opening and lying in substantially the same plane as the plane of the disc and having its opposite faces spaced inwardly a slight distance from the planes of the opposite faces respectively of the disc, said plate fitting within said opening with a snug fit and being devoid of lost motion therein, there being a central shaft-receiving hole formed in said plate by means of which the latter may be operatively mounted on the driving shaft in driving relationship, and a plurality of protuberances integrally formed on said disc at the opposite rims of said opening and overlapping the marginal edge of the plate and serving to confine the plate within the opening against dislodgment.

4. In a composite rotary tool blade, the combination set forth in claim 3 wherein said protuberances comprise increments of the metal of the steel disc which have been displaced inwardly of the opening from without the confines thereof.

5. In a composite rotary tool blade, the combination set forth in claim 3 wherein said protuberances are arranged in pairs on opposite sides of the plate with the protuberances of each pair being directly opposed to each other in an axial direction relative to the plate and disc.

6. In a composite rotary tool blade, the combination set forth in claim 3 wherein said protuberances comprise increments of the metal of the steel disc which have been displaced inwardly of the opening from outside of the confines thereof, and wherein the protuberances are arranged in pairs on opposite sides of said plate with the protuberances of each pair being directly opposed to each other in an axial direction, all of said protuberances being disposed in the immediate vicinity of a respective corner of said opening.

7. A composite rotary cutting tool blade comprising in combination a flat circular hardened steel disc having a central opening formed therein of polygonal configuration bounded by flat sides of predetermined width, cutting means carried at the outer periphery of said disc, an adaptor member by means of which the disc may be operatively mounted on a central driving shaft, said adaptor member comprising a hardened steel plate of slightly less thickness than the width of the sides of said opening and of substantially the same size and configuration as the size and configuration of the opening, said plate being disposed entirely within the confines of said opening and lying in substantially the same plane as the plane of the disc and having its opposite faces spaced inwardly a slight distance from the planes of the opposite faces respectively of the disc, said plate fitting within said opening with a close coextensive fit, there being a central shaft-receiving hole formed in said plate by means of which the latter may be operatively mounted on the driving shaft in driving relationship, and a plurality of protuberances integrally formed on said disc and overlapping the marginal side edge of the plate and serving to confine the plate within the opening against dislodgment, said protuberances each comprising increments of the metal of the steel disc which have been displaced inwardly of the opening from outside the confines thereof, said protuberances being arranged in opposed pairs on opposite sides of the disc, all of said protuberances being disposed in the immediate vicinity of a respective corner of said opening with adjacent protuberances on the same side of the disc in each corner region straddling the corner.

8. The method of securing a flat hardened steel plate of polygonal configuration within an opening of the same size and configuration as that of the plate provided centrally in the circular hardened steel saw blade disc of an abrasive stone cutting tool or the like wherein the disc is of slightly less overall thickness than the overall thickness of the plate and so that the plate is disposed entirely within the confines of the opening with its opposite faces spaced inwardly from the opposite faces respectively of the disc, said method comprising placing the central regions of the disc surrounding said opening in face-to-face coextensive contact with an anvil surface, providing spacer means on the anvil surface within the confines of the opening for maintaining the plate elevated from the anvil surface a predetermined distance so that the plate is maintained in the desired position with respect to said opposite faces of the disc, placing the plate within said opening so that it rests on said spacer means, successively displacing limited portions of the metal of the disc on the upper face thereof and at spaced regions around the opening so that said displaced portions overhang the opening and overlie the peripheral edge of the plate, reversing the position of the disc on the anvil surface so that the former anvil-contacting surface is presented upwardly, and repeating the metal displacing operations at the same relative positions around the opening of the disc.

9. The combination with a rotary tool blade in the form of a flat circular metal disc member having a central aperture formed therein of non-circular configuration and having an outer peripheral cutting edge, of an adaptor member by means of which the disc member may be operatively mounted on a central driving shaft, said adaptor member comprising a flat metallic plate conforming in configuration to the non-circular configuration of said opening, said plate being disposed and fitting within said opening with a close coextensive edge-to-edge fit completely therearound, said plate being formed with a central shaft-receiving opening therethrough and with torque-receiving means outwardly offset from said opening by means of which the plate may be driven from said shaft, a limited portion of the metal of one of said members extending across the adjacent boundary of the other member and being joined to the metal of the other member in the vicinity of said disc opening at symmetrically spaced regions therearound whereby the adaptor member is permanently retained within the general confines of said central aperture.

10. The combination with a rotary tool blade in the form of a flat circular metal disc member having a central aperture formed therein of non-circular configuration and having an outer peripheral cutting edge, of an adaptor member by means of which the disc member may be operatively mounted on a central driving shaft, said adaptor member comprising a flat metallic plate conforming in configuration to the non-circular configuration of said opening, said plate being disposed and fitting within said opening with a close coextensive edge-to-edge fit completely therearound, said plate being formed with a central shaft-receiving opening therethrough and with torque-receiving means outwardly offset from said opening by means of which the plate may be driven from said shaft, the metal of said members being interlocked in the vicinity of said disc opening at symmetrically spaced regions therearound whereby the adaptor member is permanently retained within the general confines of said central aperture.

References Cited in the file of this patent

UNITED STATES PATENTS

| | | |
|---|---|---|
| 1,051,356 | Thomas | Jan. 21, 1913 |
| 1,442,415 | Starrett | Jan. 16, 1923 |
| 1,589,633 | Dunton et al. | June 22, 1926 |
| 2,324,377 | Fischer | July 13, 1943 |
| 2,694,886 | Allison et al. | Nov. 13, 1954 |